Sept. 7, 1937.  A. HAWERLANDER  2,092,160

DOUGHNUT AND METHOD OF MAKING SAME

Filed July 5, 1935

Adolf Hawerlander
INVENTOR

BY
ATTORNEY

Patented Sept. 7, 1937

2,092,160

UNITED STATES PATENT OFFICE 2,092,160

DOUGHNUT AND METHOD OF MAKING SAME

Adolf Hawerlander, New York, N. Y.

Application July 5, 1935, Serial No. 29,966

11 Claims. (Cl. 99—86)

The present invention relates to doughnuts and, more particularly, to a doughnut having an inside kernel and to a method of producing a doughnut containing an insert.

Heretofore, large and expensive machines have been used for making doughnuts in quantity which machines included a so-called forming head or dropper for forming the ring-like raw doughnut, elaborate electric heating means and propelling means for moving the doughnuts during the frying process through the heated bath of fat. Machines of this character have been too expensive to be used in households or in small shops, and did not operate economically enough to produce medium or small quantities of doughnuts. Many suggestions and proposals have been made to eliminate these inconveniences of conventional doughnut making machines but, as far as I am aware, none of these suggestions and proposals has been completely satisfactory and successful.

I have discovered that the problem can be solved in a remarkably simple manner, by providing a doughnut with an inner kernel or insert.

It is an object of the present invention to provide a novel and improved type of doughnut with an inner kernel or core.

It is another object of the present invention to provide a novel type of fat fried doughnuts which may be quickly and easily manufactured in practically any quantity without any machinery and at a moderate cost.

It is a further object of the invention to provide a unique composite doughnut which has a new taste and combination of tastes.

The invention also contemplates a method of producing the novel doughnuts manually in a simple and efficient manner and at a moderate cost.

Other and further objects and advantages of the present invention will appear from the following description taken in conjunction with the accompanying drawing, in which:—

Figure 1:
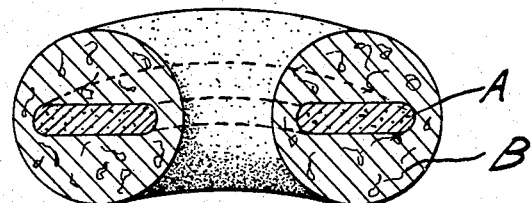
Fig. 1 illustrates a fragmentary perspective view, partly in section, of a doughnut embodying the principles of my invention.
Figure 2:
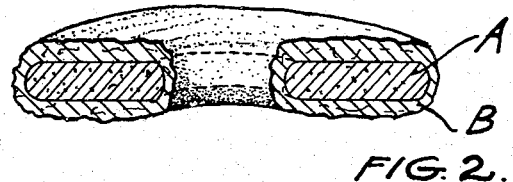
Fig. 2 shows the doughnut shown in Fig. 1 prior to the process of frying.
Figure 3:
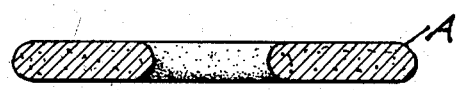
Fig. 3 depicts the core or kernel of the doughnut shown in Fig. 1.

Broadly stated, I provide according to the principles of my invention a ring-like, pre-shaped and pre-manufactured insert, kernel or core for the inside of the doughnut. The pre-manufactured insert, core or kernel may be a biscuit, a cookie, a wafer, a cracker or a cake of a suitable form and size, such as are or can be easily manufactured by conventional quantity production methods in any bake shop. Now, I prepare a batch of suitable raw doughnut dough. The kernel may be dipped in the said dough in any suitable manner. The dough will envelop the kernel or core and will form a more or less even coating or layer thereon conforming to the shape of the kernel. This layer is of smaller or greater thickness depending upon the consistency of the raw dough.

After covering the kernel with the raw dough, it is introduced into a bath of hot grease of suitable quality and temperature. In the bath, the dough on the kernel will expand and will cook or fry into a finished doughnut.

Referring now more particularly to Figs. 1 to 4 of the drawing, these figures illustrate my novel doughnut in successive phases of manufacture. The pre-shaped and pre-manufactured kernel or core A is preferably annular or of a ring-like shape, although obviously any other suitable shape may be used. This kernel or core is incorporated in the novel doughnut and is the foundation thereof. I prefer that this kernel or core is a baked product which is dry, crisp and stiff and which may be, for example, a biscuit; a cracker, such as lemon cracker, sugar cracker, butter cracker, cheese cracker, and the like; a wafer of the character used for ice cream; a cookie such as a raisin, cocoanut, fig, lemon-filled cookie, and the like; and a cake, such as sugar, cinnamon, butter cake, and the like.

The pre-manufactured kernel or core of the described character is now dipped into a batch of dough preferably by means of a suitable tool or device which may be a two or three pointed wire tongue, clamp or a pair of tweezers as those skilled in the art will readily understand. If the batch of dough has the right consistency, a uniform layer of the dough will practically completely cover the core. The dough may be prepared according to any of the conventional methods well known to those skilled in the art. For example, a batch of dough suitable for the purposes of my novel doughnut may be prepared in the following manner; about 91 pounds of soft wheat flour, about 5 pounds of sugar, about 2 pounds of egg yolk powder, about 0.5 pound of salt, about 0.5 pound of milk powder, and about 1 pound of baking powder are mixed to provide about 100 pounds of a doughnut flour mix. To provide a doughnut dough of suitable consistency, I preferably add to about 1 part by weight of this mix about 4.8 parts by weight of water and work it up thoroughly to a dough of uniform consistency. This dough has excellent properties for carrying out the dipping and gives a uniform and even layer of dough on the kernel conforming to the shape of the kernel.

After the dipping, the core, which has been coated with the suitable layer of dough, will be placed or dropped into the frying or cooking bath. I have found that the best results are obtained by means of the so-called "deep fat" method of frying, which essentially comprises frying in old fashioned style hot bath of fat or of grease in a suitable receptacle. Thus, a bath having about 4" in depth and a temperature below the smoking point has been found to give satisfactory results. For the bath, fats and oils of animal or of vegetable origin may be used, such as for example, lard, linseed oil, corn oil, peanut oil, palm oil, cocoanut oil and the like. I have found that a vegetable fat sold on the market under the trade name "Crisco" and containing essentially hydrogenated palm oil is especially suitable for making a tasty and easily digestible doughnut according to the principles of my invention.

In Fig. 1 I have illustrated the novel doughnut. As may be clearly seen, an inside core of kernel A acts as the foundation for a greatly expanded fried dough B which practically completely covers the kernel with a substantially uniform layer.

Figure 5:
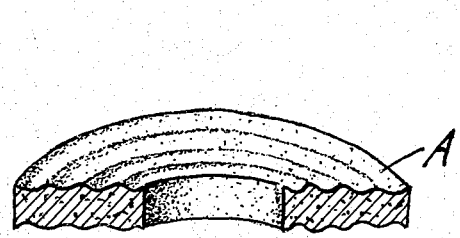
Fig. 5 shows a fragmentary perspective view, partly in section, of a modified kernel or core to be used in my improved doughnut.
Figure 4:
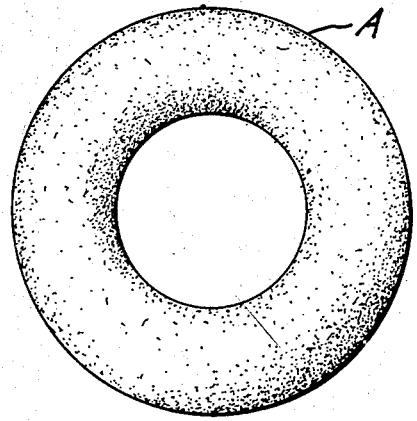
Fig. 4 is a plan view of the kernel depicted in Fig. 3.
Figure 6:
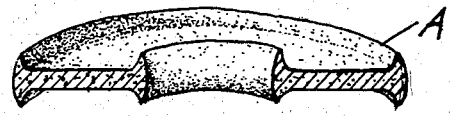
Fig. 6 illustrates another modified kernel or core for the new doughnut.
Figure 7:
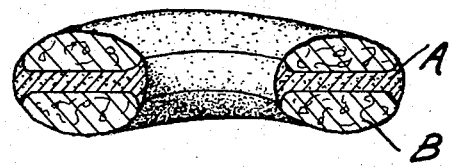
Fig. 7 depicts the doughnut made with the kernel shown in Fig. 6.

In Figs. 5 and 6, different modifications of the kernel are shown. A finished doughnut made with the kernel illustrated in Fig. 6 is shown in Fig. 7. As clearly appears from Fig. 7, this type of kernel exposes a part of the outer peripheral and marginal reinforced portion of the kernel to view whereby a novel and attractive doughnut is provided.

It is to be observed that the aroma and the taste of the inner kernel or core will remain practically unchanged by the frying process due to the fact that the temperature of the kernel, which is insulated from the frying fat by means of the external layer of dough, remains considerably below the temperature of the fat. The flavor and the aroma of the kernel will be practically sealed within the outer layer. This makes it possible to provide novel and pleasant tastes or combinations of novel tastes which have been unknown or impossible prior to my invention.

It is also to be noted that my novel method of making doughnuts is extremely simple and inexpensive and may be carried out economically at small cost and even in the average household or in small shops without the use of costly machinery or elaborate equipment. At the same time, my improved method provides considerable advantages for the purposes of producing doughnuts of a novel and improved character in smaller or in larger quantities.

Although I have described the principles of my invention in connection with a few practical and preferred embodiments thereof, many variations and modifications may be resorted to and will suggest themselves to those skilled in the art without departing from the principles of the invention. All of these variations and modifications are to be considered as being within the true spirit and scope of my invention as described in the present specification and as defined in the appended claims.

I claim:—

1. The method of making doughnuts which comprises dipping a pre-manufactured and pre-shaped edible kernel constituted of a bakery product into dough to coat same with a layer of said dough, and subsequently frying said coated kernel in fat.

2. The method of making doughnuts which comprises dipping a pre-manufactured kernel constituted of a bakery product having a substantially annular shape into a batch of dough to provide same with a practically uniform layer of said dough, and subsequently frying said kernel in a receptacle containing a bath of fat at a temperature below the smoking point.

3. In a method of making doughnuts, the steps which comprise coating a pre-manufactured and pre-shaped core constituted of a bakery product with a substantially uniform layer of dough by means of dipping and subsequently frying said core in a receptacle containing a hot bath of fat.

4. In a method of making doughnuts, the steps which comprise coating a pre-manufactured core constituted of a bakery product of substantially annular shape with a practically uniform and even layer of dough by means of dipping, and subsequently frying the said core in a bath of hot fat having at least 4" in depth.

5. The method of making doughnuts with a pre-manufactured, dry-crisp inner kernel constituted of a bakery product such as a cracker, biscuit, wafer, cookie and the like which comprises dipping said kernel into a batch of dough having suitable consistency and thereby coating same with a practically uniform layer of said dough, introducing said coated kernel into a frying bath, and frying said kernel in said bath whereby the outer coating of dough is fried and expanded but the inner kernel remains substantially unchanged.

6. The method of making doughnuts having a pre-manufactured, edible kernel constituted of a bakery product such as a cracker, biscuit, wafer, cookie and the like being of dry-crisp character and of annular shape which comprises preparing a batch of doughnut dough of viscous consistency, dipping said pre-manufactured kernel into said dough to coat same with a substantially uniform layer of said dough, and subsequently frying said coated kernel in a hot bath of fat whereby the outer coating of dough will be expanded and fried and the inner kernel will remain practically unchanged.

7. As a new article of manufacture, a doughnut comprising a pre-manufactured and pre-shaped kernel constituted of a bakery product, and an outer layer of fried dough substantially covering said kernel with a practically uniform layer.

8. As a new article of manufacture, a doughnut comprising a pre-manufactured, edible kernel constituted of a bakery product having a substantially annular shape, and an outer coating of fat-fried and expanded doughnut dough on said kernel covering said kernel with a practically uniform layer.

9. As a new article of manufacture, a doughnut comprising a pre-manufactured inner core constituted of a bakery product such as a cracker, biscuit, wafer, cookie and the like having substantiallly annular shape, and an outer coating of fat-fried and expanded doughnut dough substantially covering said inner core with a practically uniform layer.

10. As a new article of manufacture, a doughnut comprising as a core a pre-manufactured dry-crisp bakery product having a flat and ring-like shape and having concentric grooves on the surface thereof, and an outer coating of fat fried doughnut dough covering said core with a coating having a substantially smooth outer surface.

11. As a new article of manufacture, a doughnut comprising as a core a pre-manufactured dry-crisp bakery product having an annular shape of an I-like cross section, and an outer coating of fat fried, expanded doughnut dough covering said core and substantially completing said I-like cross section to a circular cross section.

ADOLF HAWERLANDER.